Nov. 4, 1969  A. SABATINO  3,476,611
INTERCELL CONNECTION AND METHOD OF MAKING SAME
Filed Dec. 8, 1964
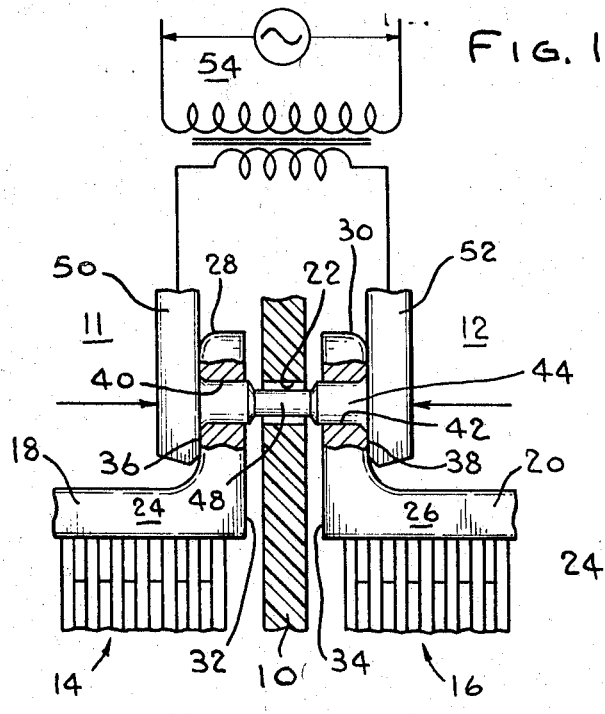
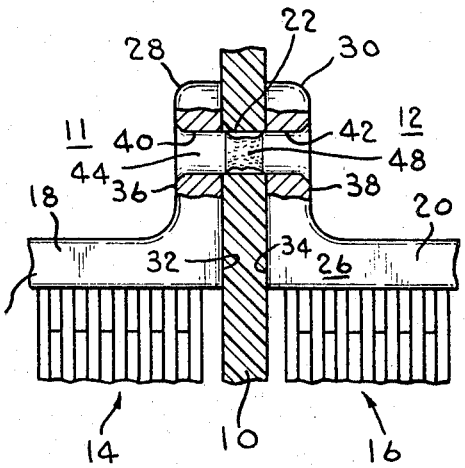
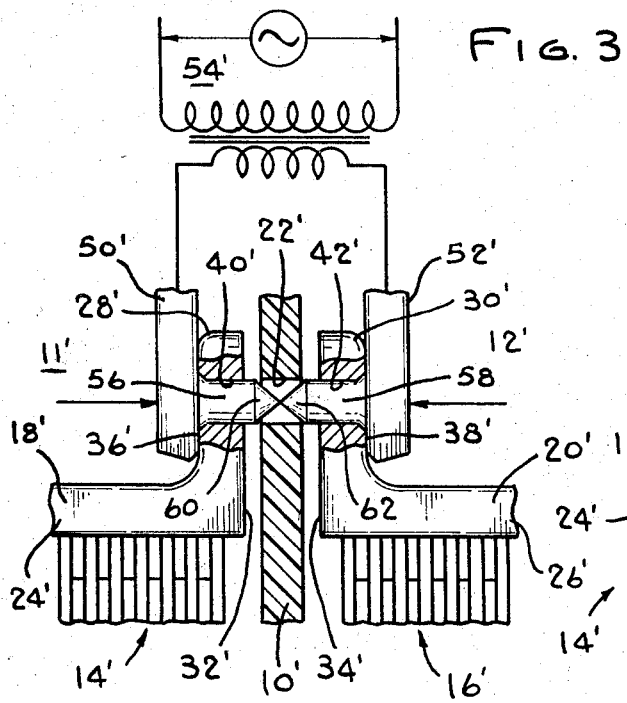
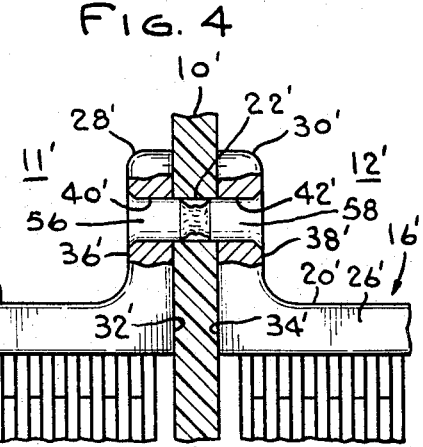
INVENTOR
ANTHONY SABATINO
BY *Gerrit D. Foster*
ATTORNEY United States Patent Office 3,476,611
Patented Nov. 4, 1969

3,476,611
INTERCELL CONNECTION AND METHOD OF MAKING SAME
Anthony Sabatino, Minneapolis, Minn., assignor to Globe-Union Inc., Milwaukee, Wis., a corporation of Delaware
Filed Dec. 8, 1964, Ser. No. 416,854
Int. Cl. H01m 13/10, 35/32
U.S. Cl. 136—134      15 Claims

ABSTRACT OF THE DISCLOSURE

A battery with improved intercell connections of the type which extend through an opening in the battery partition. In one embodiment a connection is formed with a pin which extends through the partition between two adjacent compartments and the pin has dimensions such that when it is fluidized during processing, the volume of the pin material does not exceed the volume defined by the walls of the opening.

---

This invention relates to battery intercell connections of the type which extend through an opening in a battery partition wall and to the method of making such connections.

In a storage battery of conventional construction cell element assemblies are arranged in separate compartments formed in the battery case by partition walls. The cell element assemblies are made up of a plurality of plates of alternate polarity with an intercell connection joining plates of one polarity in a cell assembly to plates of an opposite polarity in an adjacent cell assembly. A co-pending application of Anthony Sabatino and Daniel Orlando, Ser. No. 132,660, filed Aug. 21, 1961, entitled "Storage Battery Construction and Method of Making Same" and assigned to the assignee of this application, describes and claims a method of making such intercell connections through the partition walls. As stated above this invention relates to an intercell connection of that type and a general object of this invention is to provide an effective intercell connection and a facile method of making same.

A further object of this invention is to prevent cracks in the partition wall while providing an effective seal at the intercell connection.

For the achievement of these and other objects, this invention contemplates an intercell connection which does not stress the partition wall around the intercell opening thereby eliminating that factor as a source of partition wall cracks. More specifically, it is proposed that the volume of material of that part of the intercell connector which is disposed in the intercell opening be less than, or at the most no greater than, the area defined in the intercell opening. This is preferably achieved by providing the intercell connector with a reduced cross sectional area intermediate its ends and arranged generally within the intercell opening. With this construction, the battery straps can be pressed into intimate sealing engagement on opposite sides of the partition wall to achieve an effective intercell seal without the danger of the intercell connector stressing the partition wall around the intercell opening. Preferably, this sealing engagement of the conductive straps with the partition walls is achieved by pressing the conductive straps toward the partition walls while fluidizing the intercell connector to permit conductive strap movement. Fluidization is preferably achieved electrically by passing an electric current through the intercell connector and in this respect providing the intercell connector with a portion of reduced cross sectional area affords the dual advantage of not only eliminating the danger of stressing the partition wall but also provides a high resistance point in the connector thereby localizing and affording some measure of control over the occurrence of such fluidization.

Another more specific aspect of this invention lies in the intercell connector being separate from the conductive battery straps before the intercell connection is made, but of course fixed to the conductive straps after the intercell connection has been completed. With this arrangement it is not necessary to precisely align the battery cell straps with the intercell opening during assembly. General alignment is sufficient since positioning the conductive member in the intercell opening and in engagement with the conductive straps on either side of the partition wall properly orients the members for completion of the intercell connection. Accordingly, a more specific object of this invention is to provide a battery cell construction which does not require precise alignment of the conductive battery straps prior to making the intercell connection.

Other objects and advantages will be pointed out in, or be apparent from the, description and claims, as will obvious modifications of the embodiments shown in the drawing, in which:

FIG. 1 is a sectional view of a portion of the battery illustrating the relationship of the intercell connecting elements prior to completion of the intercell connection;

FIG. 2 illustrates the embodiment of FIG. 1 after the intercell connection has been completed;

FIG. 3 is a partial section of an alternative embodiment of this invention again illustrating the relationship of the intercell connecting elements prior to completion of the intercell connection; and FIG. 4 is a section view illustrating the embodiment of FIG. 3 after the intercell connection has been completed.

For convenience, only a portion of a battery has been illustrated in the drawing and it will be appreciated that the remainder of the battery construction (its case, cover and cell element assemblies) can be of conventional construction. As is well known in the art, partition wall 10 cooperates with adjacent partition walls (not shown) to define cell element compartments 11 and 12. Cell element assemblies 14 and 16 are arranged in compartments 11 and 12 on opposite sides of partition wall 10 and each assembly includes a conductive strap portion 18 and 20. One of the conductive straps, for example 18, is connected to the positive plates of assembly 14 and strap 20 is then connected to the negative plates of assembly 16 with straps 18 and 20 being electrically and mechanically connected, in a manner to be explained more completely hereinafter, through intercell opening 22 in the partition wall. Since a description of only one intercell connection is necessary to a proper understanding of this invention, only one such connection has been illustrated in the drawing but, in accordance with conventional practice, the cell element assemblies will each include another conductive strap (not shown) connected to the negative and positive plates of cell element assemblies 14 and 16, respectively. These additional conductive straps are connected to conductive straps of adjacent cell element assemblies and the end cell element assemblies include terminal members extending exteriorly of the case for connection of the batteries in an electrical circuit.

In the illustrated preferred embodiment, straps 18 and 20 are generally L-shaped each including a horizontal portion 24 and 26 connected to the negative of positive plates of their respective cell element assemblies as described above and also a vertical portion 28 and 30. The vertical portions in turn each include a planar face 32 and 34 facing toward partition wall 10 and a rear face 36 and 38 facing away from the partition wall. Connection between the conductive straps is made by elongated pin 44 disposed in through openings 40 and 42 in the vertical conductive strap portion and extending through intercell opening 22. Conductive straps 18 and 20 are generally made of lead and pin 44 is also preferably made of lead. Pin 44 is characterized by a portion 48 having a reduced cross section as compared to the cross section of the internal opening and which, when the pin is arranged to make the intercell connection, is positioned between the conductive straps and in the intercell opening. This reduces the amount of material in the intercell opening and eliminates stressing of the partition by the intercell connection.

In forming the intercell connection, pin 44 is positioned as illustrated in FIG. 1 and connected to both conductive straps in such a manner that planar faces 32 and 34 of the conductive straps are initially spaced from the partition wall. Connection of the pin to the straps can be made in any conventional manner, for example, by staking or burning the pin ends to the rear faces 36 and 38 of the straps to form both an electrical and mechanical connection with the conductive straps. Connection to the rear faces of the conductive straps is preferred as this point is exposed and readily accessible. To complete the intercell connection the central portion of the pin (the portion 48 of reduced cross sectional area) is fluidized and a force is exerted on both conductive straps in a direction toward the partition walls. Preferably, heat and pressure are applied to the pin by clamping the conductive straps between jaws 50 and 52 which are supported for movement toward and away from the partition walls in any suitable conventional manner (not shown). The jaws are urged toward each other with a predetermined pressure and are connected to a suitable electrical source 54 so that an electrical current can be passed through the pin simultaneously with the application of pressure. The reduced cross sectional portion of pin 48 exhibits a higher electrical resistance, as compared to the ends of the pin, causing that portion to fluidize permitting the conductive strap portions to move toward the partition wall in response to the force exerted thereon by the clamping jaws. Establishing the intercell connection through the application of heat and pressure is more specifically described in the above identified co-pending application of Anthony Sabatino and Daniel Orlando and reliance is placed on that application for a disclosure of particular pressures, currents and various holding times necessary to achieve a typical connection.

The reduced cross section portion of the pin localizes pin fluidization to a point within the intercell opening and between the conductive straps and also permits the intercell connector to expand within the intercell opening in response to movement of the conductive straps toward the partition walls without stressing the partition wall or creating cracks in the area of the intercell opening. More particularly, the reduced cross sectional area portion is selected such that the volume of the pin material extending between the planar faces 32 and 34 of the conductive straps is less than, or at the most no greater than, the area defined by the partition opening so that the amount of material accumulated in the intercell opening will be insufficient to stress the partition wall.

Since it is essential that a positive seal be provided at the partition opening to prevent leakage between the cell element compartments, the efficacy of this arrangement may at first be questioned for it may appear that if the material does not fill the intercell opening a positive seal will not occur at that opening and, correspondingly, between the cell element compartments. On the contrary, it has been observed that since the partition wall about the opening is not stressed during formation of the intercell connection thereby eliminating the danger of the partition wall cracking as a result of accumulation of the conductive pin material in the opening, the planar faces 32 and 34 of the conductive straps can be pressed into more intimate, sealing engagement with the partition wall to effect a positive seal around the intercell opening. This construction eliminates the possibility of cracks in the partition wall while maintaining a positive seal at the intercell opening to prevent leakage between cell element compartments.

After the planar faces have been pressed into sealing engagement with the partition walls, the heat can be removed from the pin by interrupting current flow through the pin. After heat is removed the pressure exerted by movable jaws on the conductive straps is held for a sufficient period to permit the central portion of the pin to re-solidify thereby completing both an electrical connection between the conductive straps and a mechanical connection therebetween holding the planar faces of the straps in sealing engagement with the partition wall as illustrated in FIG. 2.

It will also be noted at this point that assembly of the pin 44 in openings in the conductive straps and extending the pin through the partition opening properly orients the conductive straps for the purpose of making the intercell connection. No further alignment of the cell element assemblies with the intercell opening, either prior to or during the formation of the intercell connection, is required.

An alternative embodiment of this invention is illustrated in FIGS. 3 and 4 of the drawing and in describing this embodiment prime numbers will be used to identify elements which correspond to those already discussed in connection with the embodiment of FIGS. 1 and 2. In this embodiment, pin 44 is replaced by a pair of separable pins 56 and 58 which are positioned in openings 40' and 42' in conductive straps 18' and 20'. The pins are suitably connected to vertical conductive strap portions 28' and 30' and terminate in conical ends 60 and 62 arranged in abutting relationship within intercell opening 22'. The conical ends provide the reduction in material volume between planar conductive strap faces 32' and 34' and also provide a high electrical resistance joint between the pins so that when an electrical current passes through the pins the conical ends will fluidize. Jaws 50' and 52' exert a force on conductive straps 18' and 20' toward the partition wall so that as the pin ends fluidize in response to passage of an electrical current they fuse together permitting the planar strap faces to move into intimate engagement with the partition wall. Here again as a result of the provision of a reduced volume of material in the intercell opening the partition wall defining the opening is not stressed and will not crack as a result of the intercell connection and a positive seal is effected by pressing the planar conductive strap faces into intimate engagement with the partition wall. After the conductive straps have been properly pressed into engagement with the partition wall the electrical current is interrupted to remove the heat from the central portion of the intercell connection but the pressure exerted by the jaws is maintained for a sufficient period to allow the fluidized portion to re-solidify forming an electrical and mechanical joint between the conductive straps of adjacent cell element assemblies. The completed intercell joint is shown in FIG. 4.

Although this invention has been illustrated and described in connection with particular embodiments thereof, it will be apparent to those skilled in the art that various changes and modifications may be made therein without departing from the spirit of the invention or from the scope of the appended claims.

What is claimed is:

1. In the method of making a battery intercell connection through an opening in a battery partition wall by successively fluidizing and re-solidifying an electrically conductive medium in said opening, the improvement of prior to fluidizing said medium arranging conductive straps of battery cell element assemblies on opposite sides of said partition opening in spaced relation from said partition wall and providing an electrically conductive medium between said conductive straps and extending through said opening, the volume of said electrically conductive medium being less than the volume defined by said opening, fluidizing said conductive medium between said conductive straps and within said aperture and, simultaneously with said fluidization, applying pressure to said conductive straps in a direction toward said partition wall and moving said conductive straps into sealing engagement with the partition wall around said opening, and, after said fluidization, maintaining said pressure on said conductive straps for a predetermined time sufficient to permit said electrically conductive medium to re-solidify in said aperture.

2. The method of making a battery intercell connection through an opening in a battery partition wall by successively fluidizing and re-solidifying an electrically conductive medium in said opening, the improvement of prior to fluidizing said medium arranging conductive straps of battery cell element assemblies on opposite sides of said partition openings in spaced relation from said partition wall and providing a volume of electrically conductive medium between said conductive straps less than the volume defined by said opening, fluidizing said conductive medium at a point between said conductive straps and, simultaneously with said fluidization, applying pressure to said conductive straps in a direction toward said partition wall and moving said conductive straps into sealing engagement with the partition wall around said opening, and, after said fluidization, maintaining said pressure on said conductive straps for a predetermined time sufficient to permit re-solidification of said electrically conductive medium.

3. The method of claim 2 wherein said electrically conductive medium is in the form of pin means engaging said electrically conductive straps and including the step of connecting said pin means to said conductive straps prior to said fluidization.

4. The method of making a battery intercell connection through an opening in a battery partition wall by the application of pressure and heat to conductive members disposed on opposite sides of said partition wall, the improvement of, prior to said application of pressure and heat arranging conductive straps of battery cell element assemblies on opposite sides of said partition openings and in spaced relation from said partition wall, providing elongated rigid conductive means having a reduced cross sectional portion intermediate its ends between said conductive straps with the ends thereof in engagement with said conductive straps and the reduced cross sectional portion thereof disposed in said partition wall opening, the volume of said conductive means extending between said conductive straps being no greater than the volume defined by said openings prior to the application of pressure and heat, connecting said conductive means to said conductive straps with said conductive straps in spaced relation from said partition wall, passing an electrical current through said conductive means to cause fluidization thereof at said reduced cross sectional portion and, simultaneously with passing said current, applying pressure to said conductive straps in directions toward said partition walls to press said conductive straps into sealing engagement with the partition wall around said opening, interrupting said current flow after said conductive straps are so engaged, and, after interrupting said current flow, maintaining said pressure on said conductive straps for a predetermined time sufficient to permit said conductive means to re-solidify.

5. The method of making a battery intercell connection through an opening in a battery partition wall comprising the steps of arranging conductive straps of battery cell element assemblies on opposite sides of said partition wall, providing conductive pin means between and in engagement with said conductive straps, said pin means having a reduced cross sectional area disposed in said partition wall opening thereby providing a volume of conductive material between said conductive straps which is no greater than the volume defined by said partition wall opening when it is unstressed prior to the formation of said connection and providing a high electrical resistance point in said partition wall opening, connecting said pin means to said conductive straps, passing a momentary fluidizing electrical current through said pin means while pressing said conductive strap portions into intimate sealing engagement with said partition wall, and maintaining pressure on said conductive straps for a predetermined time to permit said conductive means to re-solidify.

6. The method of making a battery intercell connection through an opening in a battery partition wall comprising the steps of arranging conductive straps of battery element assemblies on opposite sides of said partition wall, arranging rigid conductive means between and in engagement with said conductive straps and extending through said partition wall opening, the volume of said conductive means between said conductive straps being no greater than the volume defined by said partition wall opening when it is unstressed prior to formation of said connection, connecting said conductive means to said conductive straps with said conductive straps in spaced relation from said partition walls, fluidizing said conductive means at a point between said conductive straps, pressing said conductive straps into intimate sealing engagement with said partition wall, and re-solidifying said conductive means to hold said conductive straps in intimate sealing engagement with said partition wall.

7. The method of claim 6 wherein said conductive means is fluidized by application of heat thereto and wherein said conductive straps are pressed into sealing engagement with said partition walls by exerting a force on said conductive straps in a direction toward said partition wall, and including the steps of removing said heat from conductive means, and maintaining said force on said conductive straps for a sufficient time after the removal of said heat to allow said conductive means to re-solidify.

8. The method of making an intercell connection through an opening in a partition wall of a battery comprising the steps of positioning conductive straps of battery cell element assemblies on opposite sides of said partition wall and provding openings in each conductive strap in alignment with sad partition wall opening, arranging electrically conductive pin means in the openings of said conductive straps and extending through said partition wall opening, electrically and mechanically connecting said pin means to each of said conductive straps with said pin means extending through said partition openings and said conductive straps spaced from said partition walls, forming the volume of said pin means extending between said conductive straps so as to be less than the volume defined by said partition openings, applying heat to said pin means to cause the portion thereof between said conductive straps to fluidize and, simultaneously with application of said heat, applying pressure to said conductive straps in directions toward said partition walls to press said conductive straps into sealing engagement with the partition wall around said opening, removing said heat from said pin means, and, after removal of said heat, maintaining said pressure on said conductive straps for a time sufficient to allow re-solidification of said pin means.

9. The method of claim 8 wherein heating of said pin means is achieved by passing an electrical current through said pin means.

10. The method of claim 9 wherein said pin means is formed to comprise an elongated body having a portion of minimum cross section area intermediate its ends.

11. The method of claim 9 wherein said pin means is formed to provide a separate pin member connected to each of said conductive straps and terminating in a generally conical point in said partition wall opening.

12. The method of making an intercell connection through an opening through the partition wall of a battery comprising the steps of positioning conductive battery cell element assembly straps having planar surfaces and an opening in each of said planar surfaces on opposite sides of said partition wall with said planar surfaces facing said partition walls and said openings in alignment with the opening in said partition wall, inserting an elongated electrically conductive pin into and through said conductive strap and partition wall openings, said electrically conductive pin being formed to include end portions and a central portion, said central portion having a minimum cross sectional dimension less than that of said end portions and the minimum cross sectional dimension of said partition opening, thereby providing a volume of conductive material between said conductive straps which is less than the volume defined by said partition wall opening, electrically and mechanically connecting said pin to said conductive straps with said pin central portion disposed in said partition opening, passing a momentary electrical current through said pin to cause the reduced cross sectional portion thereof to fluidize and, simultaneously with passage of said current, applying pressure to said conductive straps in directions toward said partition wall to press said conductive strap planar faces into sealing engagement with said partition wall about said partition wall opening, and maintaining said pressure on said conductive straps for a predetermined time sufficient to permit said conductive pin to re-solidify.

13. An intercell connection between battery cell element assemblies disposed on opposite sides of the battery partition wall having an opening therethrough and wherein said conductive straps each include generally planar surfaces facing said partition wall, said intercell connection comprising, means defining an opening in each of said conductive straps opening through said planar surfaces and arranged in alignment with said partition wall opening,
pin means disposed in said conductive strap and partition wall openings, said pin means characterized by having a volume of material in said partition wall opening which is less than the volume defined by said partition wall opening,
means electrically and mechanically connecting said pin means to each of said conductive straps,
and wherein said generally planar surfaces are disposed in intimate sealing engagement with said partition wall around said partition wall opening.

14. The intercell connection of claim 13 wherein the openings in said conductive straps are through openings and wherein said pin means are connected to each of said conductive straps at a point opposite to the planar surfaces thereof.

15. The intercell connection of claim 13 wherein said pin means is further characterized by having a point of relatively high electrical resistance disposed in said partition wall opening.

References Cited
UNITED STATES PATENTS

| | | | |
|---|---|---|---|
| 2,180,959 | 11/1939 | Hopkins | 136—134 |
| 2,906,804 | 9/1959 | Rigsby | 136—134 |
| 3,313,658 | 4/1967 | Sabatino et al. | 136—134 |

WINSTON A. DOUGLAS, Primary Examiner

D. L. WALTON, Assistant Examiner

U.S. Cl. X.R.

136—176

Disclaimer 3,476,611.—*Anthony Sabatino*, Minneapolis, Minn. INTERCELL CONNECTION AND METHOD OF MAKING SAME. Patent dated Nov. 4, 1969. Disclaimer filed Apr. 5, 1972, by the assignee, *Globe-Union Inc.*
Hereby enters this disclaimer to claims 13 and 15 of said patent.
 [*Official Gazette December 26, 1972.*]